United States Patent [19]

Hirose

[11] Patent Number: 5,615,313
[45] Date of Patent: Mar. 25, 1997

[54] IMAGE PROCESSING APPARATUS HAVING SELECTABLE CONTROL OF IMAGE COLOR SIGNALS FOR PROCESSING IMAGE INFORMATION BETWEEN A PLURALITY OF APPARATUS

[75] Inventor: Masayuki Hirose, Kawasaki, Japan

[73] Assignee: Canon Kabushiki Kaisha, Tokyo, Japan

[21] Appl. No.: 225,932

[22] Filed: Apr. 11, 1994

Related U.S. Application Data

[63] Continuation of Ser. No. 128,280, Sep. 29, 1993, abandoned, which is a continuation of Ser. No. 858,965, filed as PCT/JP91/01275 Sep. 25, 1991, abandoned.

[30] Foreign Application Priority Data

Sep. 25, 1990 [JP] Japan ................................. 2-251857

[51] Int. Cl.$^6$ ................... G06F 1/06; G06F 1/08; G06F 13/42; H04L 7/06; H04N 1/32; H04N 1/387
[52] U.S. Cl. ................... 395/114; 358/409; 358/436; 358/452
[58] Field of Search ...................... 358/435, 438, 358/434, 436, 439, 452, 453, 296, 300, 448, 409; 395/114

[56] References Cited

U.S. PATENT DOCUMENTS 4,691,237  9/1987  Shimizu .................. 358/409
4,837,635  6/1989  Santos ..................... 358/453
4,878,250  10/1989 Kotera et al. .
4,910,607  3/1990  Kita et al. ................ 358/448

FOREIGN PATENT DOCUMENTS 2616608  6/1987  France .
61-78278  4/1986  Japan .
63-110869 5/1988  Japan .
1-113875  5/1989  Japan .
2-15357   1/1990  Japan .

*Primary Examiner*—Scott A. Rogers
*Attorney, Agent, or Firm*—Fitzpatrick, Cella, Harper & Scinto

[57] ABSTRACT

Signal generating means for generating a predetermined image clock signal to transfer image information and selecting means for selecting either the predetermined image clocks generated from the signal generating means or the image clocks which are generated from the signal generating means and are returned via the editing apparatus are provided on the copying apparatus side. When the predetermined image clocks to transfer the image information are generated from the signal generating means, either the predetermined image clocks generated from the signal generating means or the image clocks which are generated from the signal generating means and are returned via the editing apparatus are selected by the selecting means and can be used as common clocks when the image information which is read by the image reading means is transferred and when the image information which is generated from the editing apparatus is transferred.

20 Claims, 16 Drawing Sheets

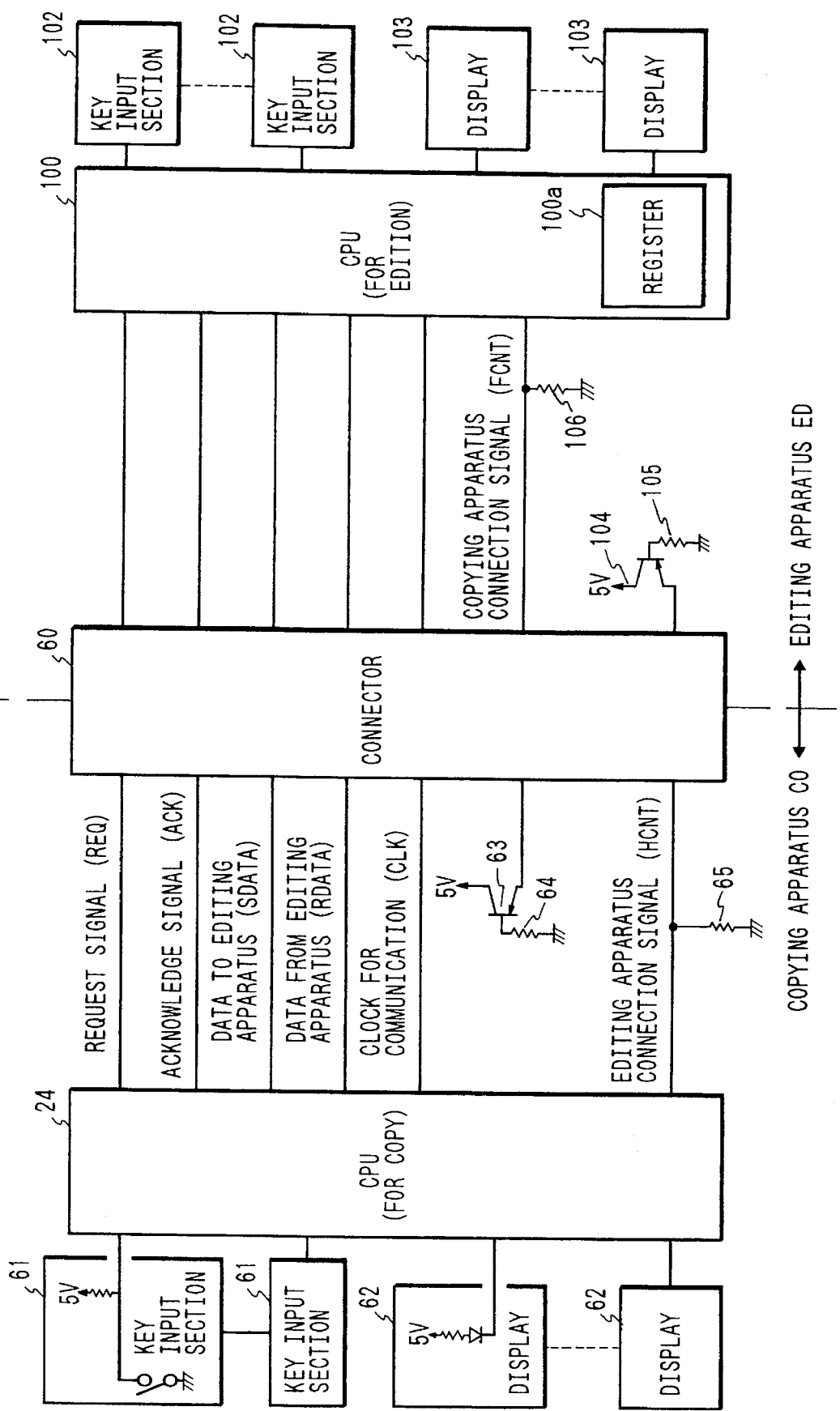

IMAGE PROCESSING APPARATUS HAVING SELECTABLE CONTROL OF IMAGE COLOR SIGNALS FOR PROCESSING IMAGE INFORMATION BETWEEN A PLURALITY OF APPARATUS

This application is a continuation of application Ser. No. 08/128,280 filed Sep. 29, 1993, now abandoned, which was a continuation of application Ser. No. 07/858,965 filed as PCT/JP91/01275 Sep. 25, 1991 now abandoned.

INDUSTRIAL FIELD OF UTILIZATION

The invention relates to an image control apparatus for controlling a mutual information transmission between a copying apparatus comprising image reading means and image forming means for recording an image onto a recording medium on the basis of image information which is generated from the image reading means and an editing apparatus which is connected to the outside through a predetermined interface.

PRIOR ART

Hitherto, in a copying apparatus, an original is converted into an electrical signal in accordance with a designated reading condition (resolution or the like) and print information is supplied to a printer or the like and a copying process of the original image is executed.

Such a copying apparatus has a predetermined interface to communicate information with an external apparatus and is constructed so that a system environment can be easily expanded by connecting an editing apparatus to perform an image edition (a reproducing color designating process or the like) as necessary.

SUBJECTS THAT THE INVENTION IS TO SOLVE

However, the information communication between the conventional apparatuses, namely, between the copying apparatus and the editing apparatus as an external apparatus is processed synchronously with the processing clocks which are respectively peculiar to the image information which has been read and the image effective information which is necessary for edition.

Therefore, there is a problem such that it is necessary for the apparatuses to mutually have clock generating means for processing the communication information and a circuit construction of the apparatus becomes complicated. Further, in order to prevent an image drop-out or the like in association with the communication, a phase adjusting circuit to adjust a phase difference between the peculiar clocks is necessary, so that there is a problem such that a reliability in the signal transmission and reception deteriorates or the like.

The present invention is made to solve the above problems and it is an object of the invention to obtain an image control apparatus in which by enabling an image clock which is generated on the copying apparatus side to be returned to the copying apparatus side via an editing apparatus, the editing apparatus and the copying apparatus can mutually transfer image information on the basis of the single image clock.

MEANS OF SOLVING THE SUBJECTS

According to an image control apparatus of the invention, signal generating means for generating a predetermined image clock signal to transfer image information and selecting means for selecting either one of the predetermined image clock generated from the signal generating means and an image clock which is generated from the signal generating means and is returned via an editing apparatus are provided on the copying apparatus side.

OPERATION

According to the invention, when a predetermined image clock to transfer the image information is generated from the signal generating means, either one of the predetermined image clock generated from the signal generating means and the image clock which is generated from the signal generating means and is returned via the editing apparatus is selected by the selecting means and can be used as a common clock when the image information which is read by the image reading means is transferred and when the image information which is generated from the editing means is transferred.

BRIEF DESCRIPTION OF DRAWINGS

FIG. 3(b) is circuit block diagram for explaining an interface between a copying CPU and an editing CPU shown in FIG. 2;

EMBODIMENTS

Figure 1:
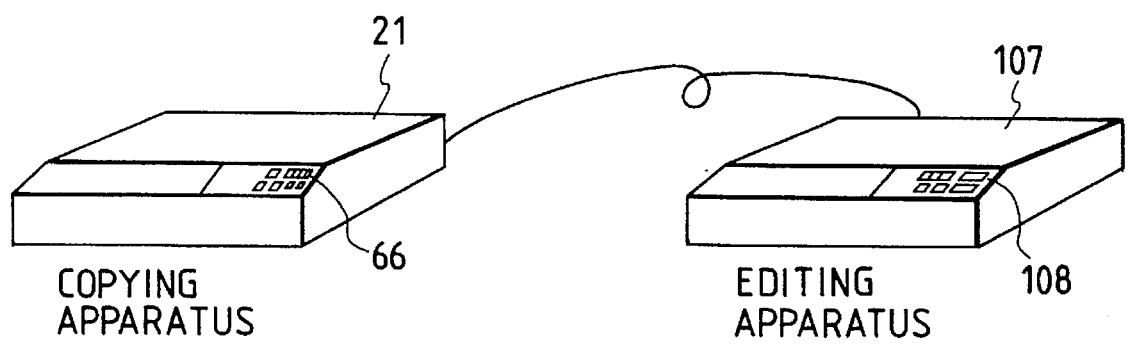
FIG. 1 is a system external view for explaining a construction of an image control apparatus showing an embodiment of the present invention.

FIG. 1 is a system external view for explaining a construction of an image control apparatus showing an embodiment of the present invention. Reference numeral 21 denotes a color copying apparatus constructing a copying apparatus. The copying apparatus has, for instance, a bubble jet type printer for generating an air bubble by a heat and for emitting an ink by a pressure of the air bubble. Reference numeral 66 denotes an operation panel (operating section) on which keys to set an image reading mode, a copying mode, or the like and a display are arranged.

Reference numeral 107 denotes an editing apparatus which is connected through a predetermined interface and executes an image editing process, which will be explained hereinlater, by an image clock which is supplied from the color copying apparatus 21. Reference numeral 108 denotes an operation panel on which keys to designate a color converting process or the like, a display, and the like are arranged.

Figure 2:
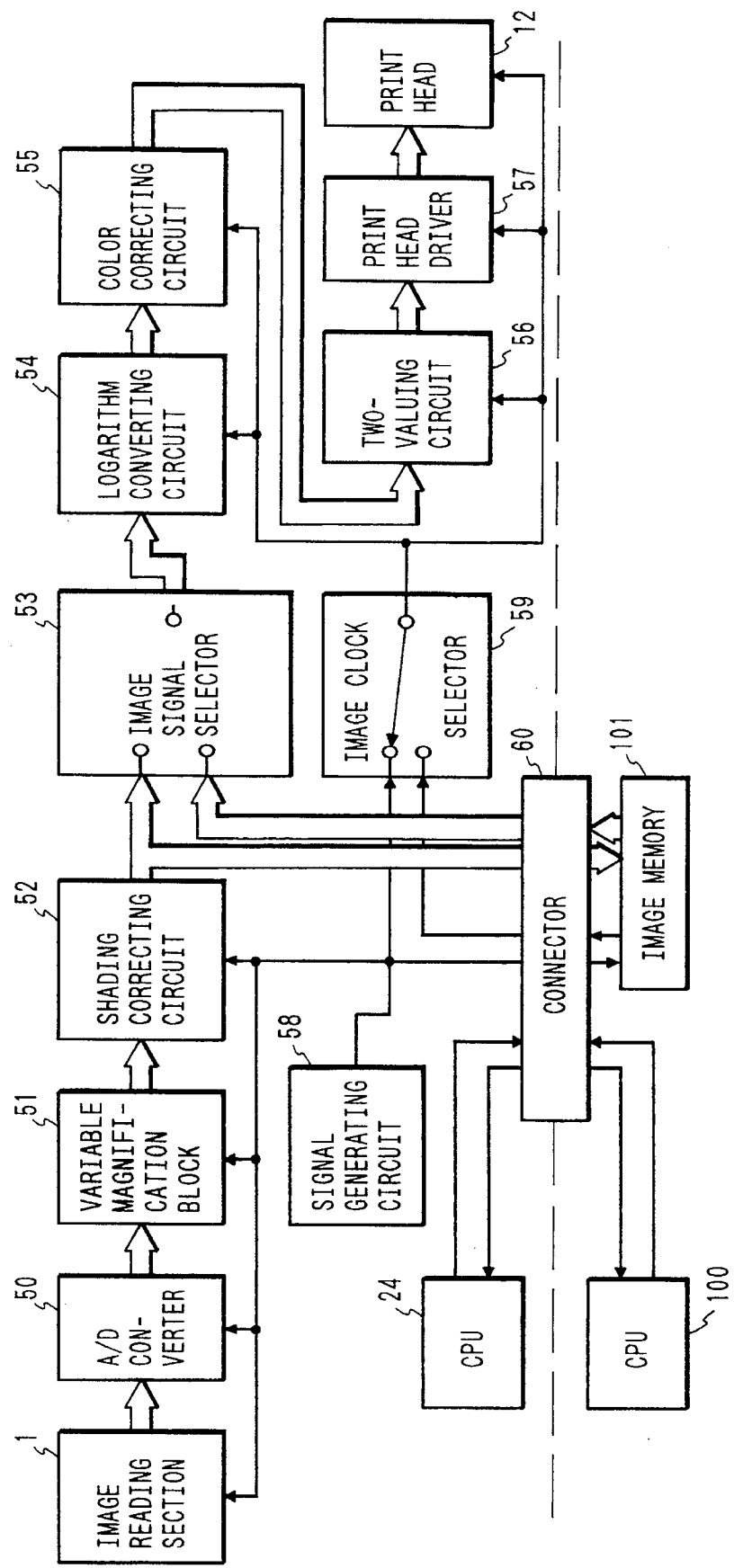
FIG. 2 is a block diagram for explaining a control construction of the image control apparatus shown in FIG. 1.

FIG. 2 is a block diagram for explaining a control construction of the image control apparatus shown in FIG. 1. Reference numeral 1 denotes an image reading section (image sensor) comprising a charge coupled device such as a CCD or the like. The image reading section 1 reads an original (not shown) and converts the information of the original into analog image signals of R (red), G (green), and B (blue). Reference numeral 50 denotes an A/D converter for converting the analog image signals obtained by the image reading section (image sensor) 1 into the digital image signals of, for example, eight bits.

Reference numeral 51 denotes a variable magnification block for reducing/enlarging an image. Reference numeral 52 denotes a shading correcting circuit for correcting the image signals in consideration of a variation of photo sensitivities or the like of elements constructing the image reading section (image sensor) comprising the charge coupled device such as a CCD or the like.

Reference numeral 53 denotes an image signal selector (selector) to select either one of the image signal of the original which is derived by the image reading section (image sensor) 1 comprising a charge coupled device such as a CCD or the like and image data which has previously been stored in an image memory 101 (provided on the side of the editing apparatus 107) in accordance with an instruction from a CPU 24 for copying.

Reference numeral 54 denotes a logarithm converting circuit for converting the image data of R (red), G (green), and B (blue) into the image signals of cyan (C), magenta (M), and yellow (Y). Reference numeral 55 denotes a color correcting circuit for correcting the image signals in order to match the output characteristics of the image reading sensor to the colors with the characteristics of the colors of print inks. Reference numeral 56 denotes a two-valuing circuit to convert a multivalue data (image signal) of eight bits into two-valued data of one bit. Reference numeral 57 denotes a print head driver for supplying an electric power to a print head 12 on the basis of the two-valued data of one bit derived by the two-valuing circuit 56.

Reference numeral 58 denotes a signal generating circuit constructing signal generating means according to the invention. The signal generating circuit 58 generates image clocks (a clock 1T, a clock 2T, a clock 4T, and a clock 8T having different periods) and image discrimination signals VE and BVE.

Reference numeral 59 denotes an image clock selector (selector) for selecting either one of the image clocks (the clock 1T, clock 2T, clock 4T, and clock 8T having different periods) which are directly supplied from the signal generating circuit 58 and the image discrimination signals VE and BVE or the image clocks which are transmitted from the signal generating circuit 58 and are returned via the image memory 101 in accordance with an instruction from the CPU 24.

Reference numeral 60 denotes a connector for interface to connect signal lines to transmit and receive the image signal, image clocks, image discrimination signals, and the like between the CPU 24 and a CPU 100 (on the side of the editing apparatus 107) from the copying apparatus to the editing apparatus and from the editing apparatus to the copying apparatus.

In the image control apparatus constructed as mentioned above, when predetermined image clocks to transfer the image information are generated from the signal generating means (signal generating circuit 58 in the embodiment), either the predetermined image clocks generated from the signal generating means or the image clocks which are generated from the signal generating means and are returned via an editing apparatus ED are selected by the selecting means (image clock selector 59 in the embodiment) and can be used as common clocks when the image information which is read from the image reading means is transferred and when the image information which is supplied from the editing apparatus ED is transferred. The image memory 101 has a function for storing the image signal, for generating the stored image signal, and for processing the image clocks and image discrimination signals on the basis of predetermined information and generating.

Figure 3A:
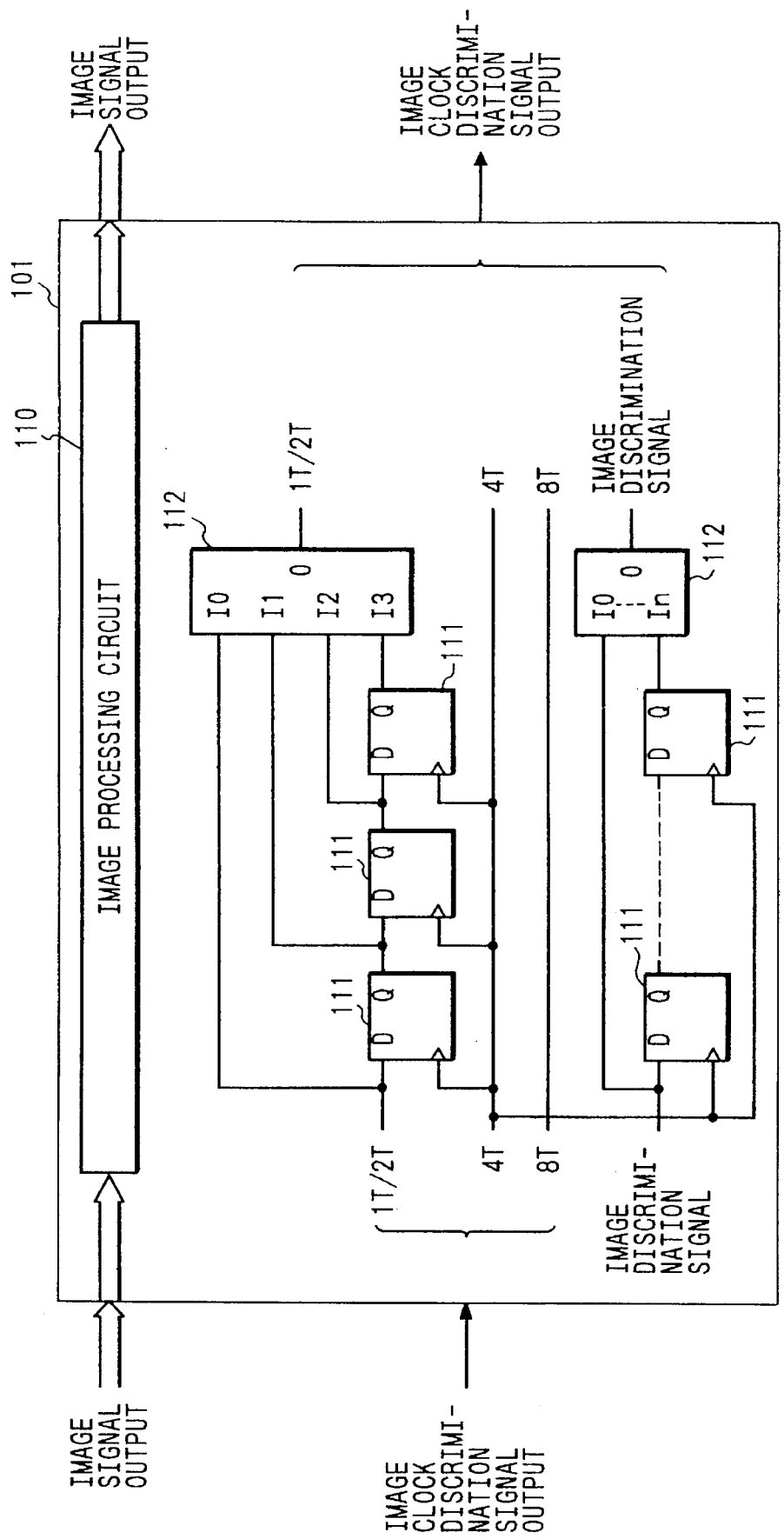
FIG. 3(a) is a circuit block diagram for explaining a construction of an image memory shown in FIG. 2.

FIG. 3(a) is a circuit block diagram for explaining a construction of the image memory 101 shown in FIG. 2 and the construction and operation will now be described hereinbelow.

A necessary image process is executed to the image signal by an image processing circuit 110. In the image processing circuit 110, a delay of n image clocks 4T (n is an integer value of 0 to n) is given in accordance with the content of the image process. Among the image clocks, the image clocks 4T and 8T are generated as they are.

As for the image clocks 1T and 2T, phases of the input image and output image are matched (for instance, they are made correspond to the red signal R when the image clocks 1T and 2T are at the "H level") by DFFs 111 and selectors 112. On the other hand, in order to give the same delay as the delay (delay corresponding to n image clocks 4T) which is given in the image processing circuit 110, the image discrimination signals are transmitted through the DFFs 111 and the selectors 112 to select the delay value and a desired delay is given.

FIG. 3(b) is a circuit block diagram for explaining the interface between the copying CPU 24 and the editing CPU 100 shown in FIG. 2. Reference numeral 61 denotes a key input section provided in the operating section 66 and 62 indicates display devices arranged above the operating section 66. For instance, the display devices 62 are constructed by LEDs or the like and display the copying mode or the like which is being set.

Reference numeral 63 denotes a transistor whose base side is connected to the ground through a resistor 64 and generates a copying apparatus connection signal FCNT for notifying the editing apparatus ED of a state in which a power source (for example, 5 V) of a copying apparatus CO is ON.

Reference numeral 65 denotes a pull-down resistor for connecting an editing apparatus connection signal (HCNT) line to the ground side when the editing apparatus or the like is not connected to the IF connector (connector) 60.

Reference numeral 102 denotes a key input section. An editing mode or the like which is instructed by the key input section 102 is selectively displayed by display devices 103 which are constructed by LEDs or the like.

Reference numeral 104 denotes a transistor whose base side is connected to the ground through a resistor 105 and generates the editing apparatus connection signal HCNT to notify the copying apparatus of a state in which a power source (5 V) of the editing apparatus is ON.

Reference numeral 106 denotes a pull-down resistor to set the copying apparatus connection signal (FCNT) line to the ground level when the copying apparatus CO is not connected to the IF connector 60. Reference numeral 100a denotes a register.

Figure 4:
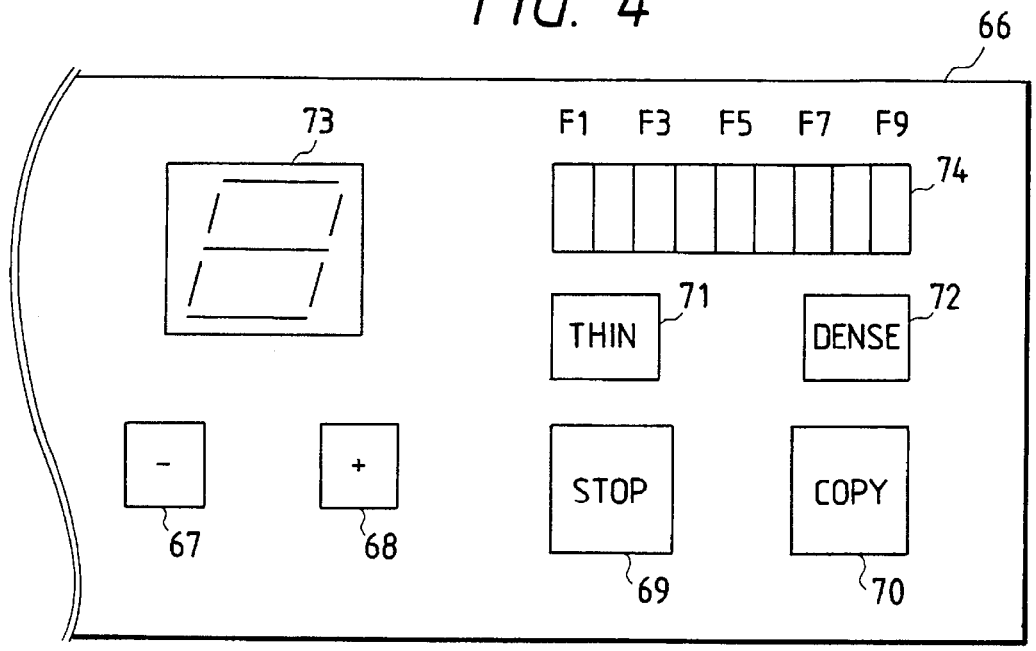
FIG. 4 is a plan view of a main section for explaining a construction of an operating section of the copying apparatus shown in FIG. 1.

FIG. 4 is a plan view of a main section for explaining a construction of the operating section 66 of the copying apparatus shown in FIG. 1. Reference numeral 67 denotes a minus key which is depressed to reduce the set number of copies; 68 a plus key to increase the set number of copies; 69 a stop key which is depressed to interrupt the operation during the copying operation; 70 a copy key which is depressed to set the copy start; 71 a set key which is depressed to reduce a density set in the copying apparatus CO; 72 a set key which is depressed to increase a density set in the copying apparatus CO; and 73 a display device which is constructed by, for example, an LED of seven segments and displays the set number of copies and the number of copied sheets (or the number of remaining copies).

Reference numeral 74 denotes a set density display to display a set density step by step by depression of the set keys 71 and 72.

Figure 5:
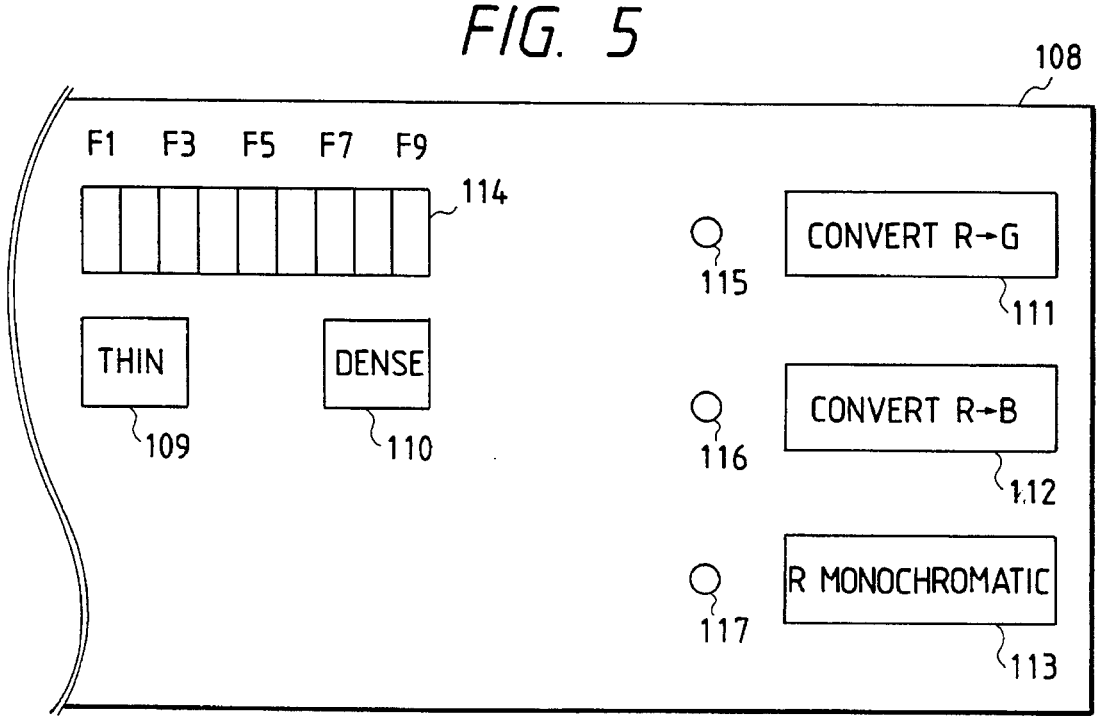
FIG. 5 is a plan view of a main section for explaining a construction of an operating section of an editing apparatus shown in FIG. 1.

FIG. 5 is a plan view of a main section for explaining a construction of the operating section 108 of the editing apparatus shown in FIG. 1. Reference numeral 109 denotes a set key which is depressed to set a copy density into a slightly thin value in the editing apparatus ED. Reference numeral 110 denotes a set key which is depressed to set a copy density to a slightly dense value in the editing apparatus ED; 111 a mode selecting key which is depressed to color convert R (red) into G (green); 112 a mode selecting key which is depressed to color convert R (red) into B (blue); and 113 a mode selecting key which is depressed to print in only R (red).

Reference numeral 114 denotes a set density display to display a set density step by step by depression of the set keys 109 and 110.

Reference numeral 115 to 116 denote mode displays comprising LEDs or the like to display the set states in response to the depression of the mode selecting keys 111 to 113.

Figure 6:
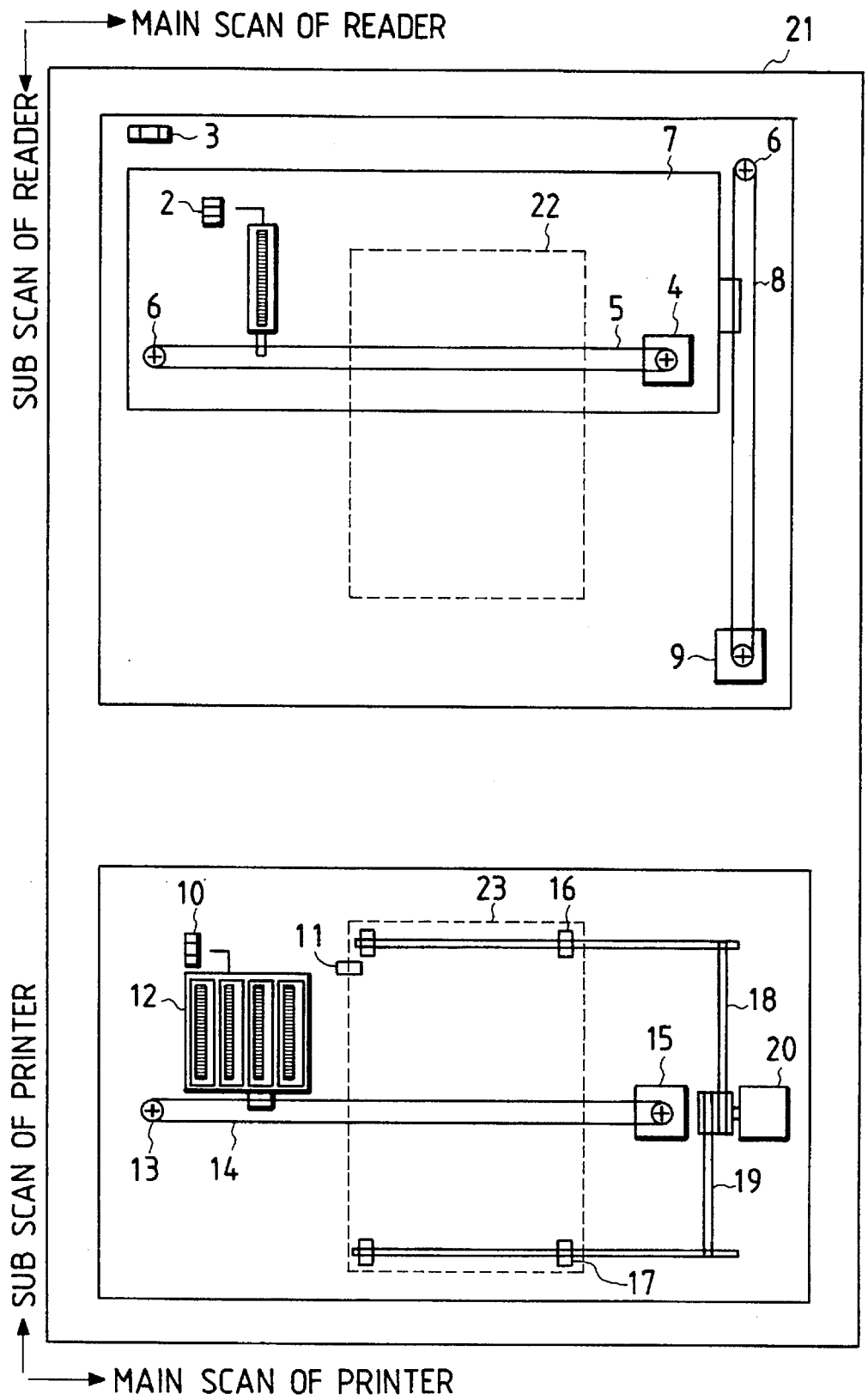
FIG. 6 is a plan view for explaining a construction of a color copying apparatus shown in FIG. 1.

FIG. 6 is a plan view for explaining a construction of the color copying apparatus 21 shown in FIG. 1. Reference numeral 2 denotes a photo interrupter to detect a reference position of the main scan of a reader; 3 a photo interrupter to detect a reference position of the sub scan of the reader; 4 a stepping motor to move the image sensor 1 in the main scanning direction; and 5 a belt which is wound through a pulley 6 so that the image sensor 1 can move in the main scanning direction in association with the driving of the stepping motor 4.

Reference numeral 7 denotes a chip board to install parts for main scan.

Reference numeral 8 denotes a belt in which one end is wound through the pulley 6 and the other end is fixed to a stepping motor 9. Thus, the chip board 7 can move in the sub scanning direction by the rotation of the stepping motor 9. Reference numeral 22 denotes an original.

Reference numeral 10 denotes a photo interrupter to detect a reference position of the main scan of the printer; 11 a photo interrupter to detect the presence or absence of a paper of the printer and a reference position (front edge of the paper) of the paper; 12 the head to print which is constructed by 100 nozzles of each of the colors of cyan (C), magenta (M), yellow (Y), and black (Bk) to print the ink papers of those colors; and 13 a pulley which is driven by a stepping motor 15 and rotates a belt 14 which is wound. The head to print (print head) 12 is fixed to one end of the belt 14 and scans and moves the print head 12 in the main scanning direction in accordance with the motion of the stepping motor 15. Reference numerals 16 and 17 indicate rollers. The roller 16 processes the front edge of the paper. The roller 17 presses the read edge of the paper. Reference numeral 20 denotes a stepping motor around which belts 18 and 19 are wound and which moves the paper 23 in the sub scanning direction.

Figure 7:
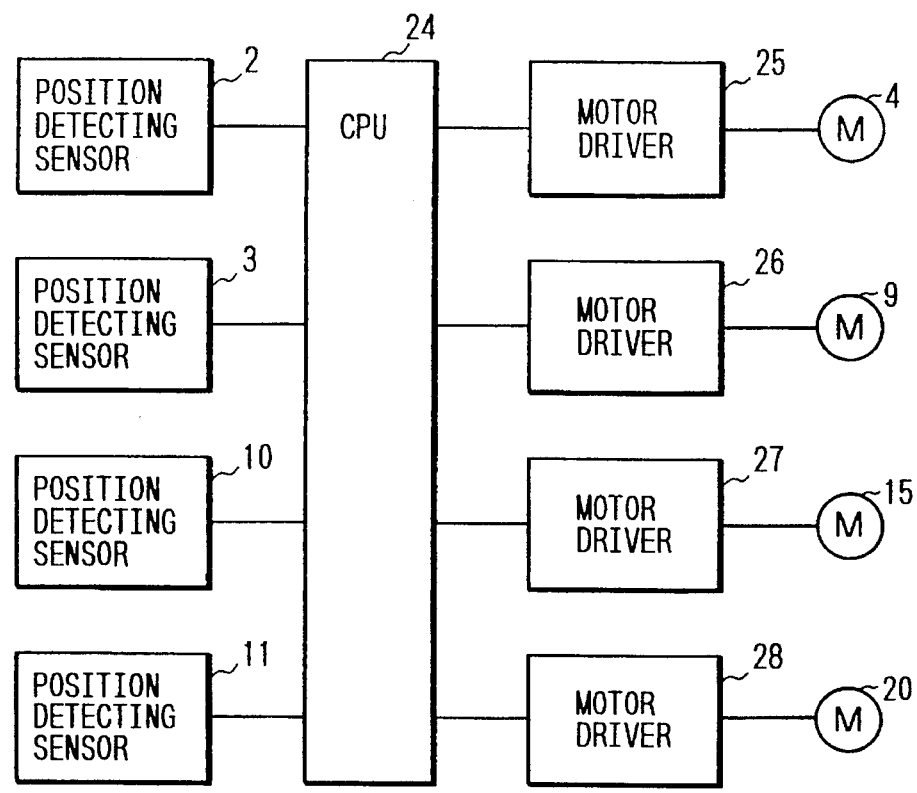
FIG. 7 is a block diagram for explaining input/output devices of the CPU shown in FIG. 2.

FIG. 7 is a block diagram for explaining input and output devices of the CPU 24 shown in FIG. 2 and the same component elements as those shown in FIG. 6 are designated by the same reference numerals.

In the diagram, reference numerals 25 to 28 denote motor drivers to supply electric powers to a main scanning motor and a sub scanning motor of the reader and printer on the basis of control signals from the CPU 24.

Figure 8:
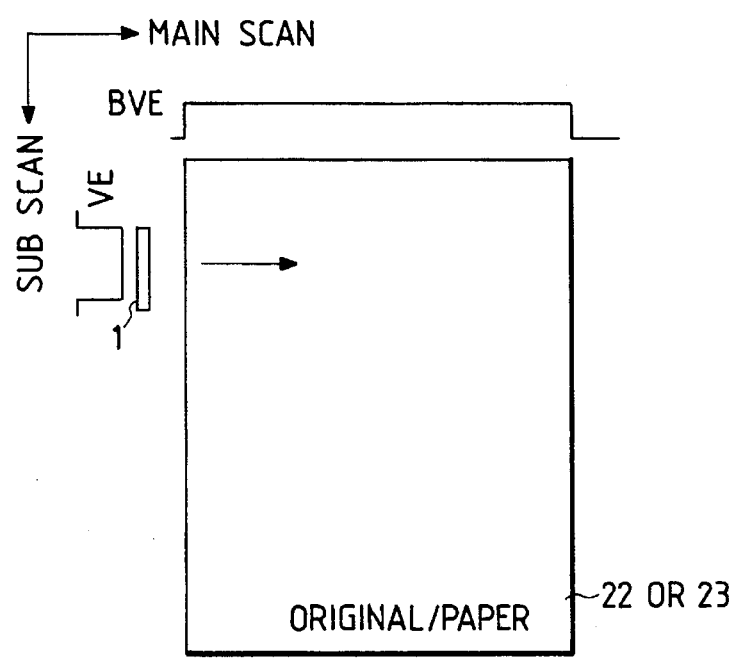
FIG. 8 is a diagram for explaining the relation between an image discrimination signal and a scanning direction in the copying apparatus shown in FIG. 1.

FIG. 8 is a schematic diagram for explaining the relation between the image discrimination signals and the scanning directions in the copying apparatus shown in FIG. 1.

Figure 9:
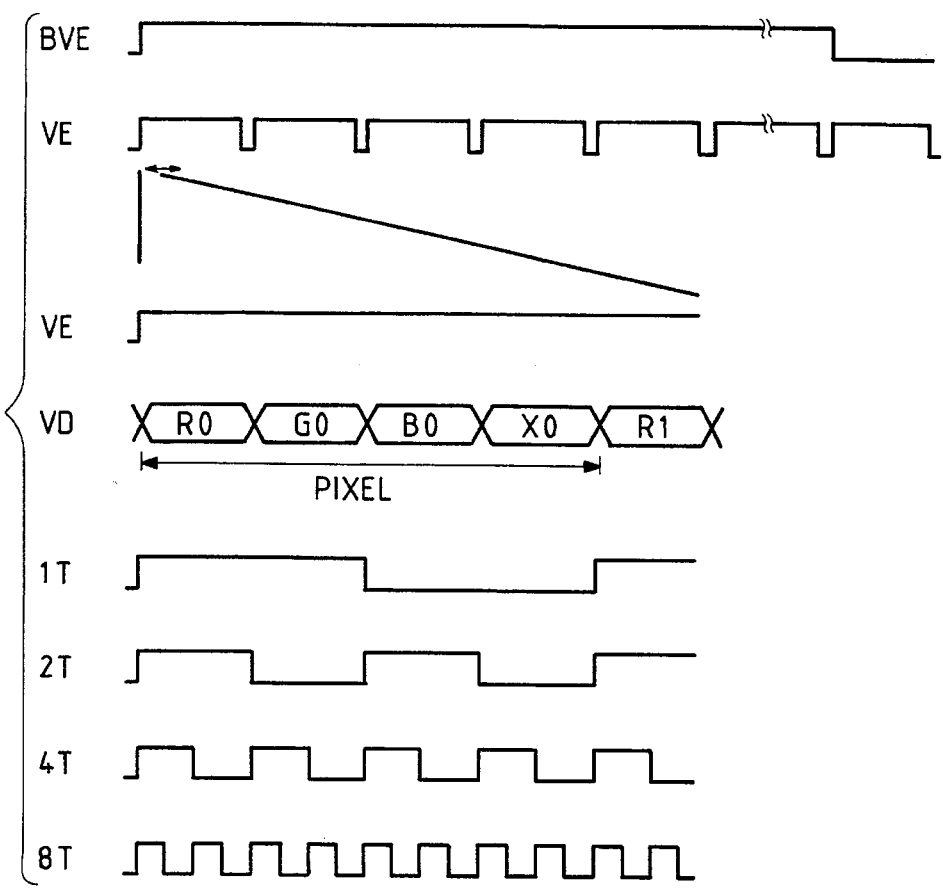
FIG. 9 is a timing chart for explaining the image processing operation of the copying apparatus shown in FIG. 1.

FIG. 9 is a timing chart for explaining the image processing operation of the copying apparatus shown in FIG. 1.

In the diagram, reference numerals 1T, 2T, 4T, and 8T denote the image clocks whose periods are shorter by ½ at a time.

In the embodiment, the pixel arranging direction of the image sensor 1 and the nozzle direction of the print head 12 are defined as a sub scanning direction and are specified by the image discrimination signal VE. Therefore, an image effective range in the sub scanning direction relates to the case where the image discrimination signal VE is at the H level.

On the other hand, the direction in which the image sensor 1 moves while reading the image and the direction in which the printer head 12 moves while printing data onto a paper are defined as a main scanning direction and are specified by the image discrimination signal BVE. Consequently, an image effective range in the main scanning direction relates to the case where the image discrimination signal BVE is at the H level.

As will be understood from the above diagrams, the image discrimination signal BVE changes in response to the leading edge of the image discrimination signal VE and the time (image effective range) of the H level changes in dependence on the original, paper width, magnification, and the like. The image discrimination signal VE changes in response to the leading edge of the image clock $T_1$ and the time (image effective range) of the H level is determined by the number of pixels of the image sensor 1 and the number of nozzles of the print head. One pixel of an image signal VD is constructed by components of the red signal R, green signal G, blue signal B, and black signal X. The black signal X is produced by the color correcting circuit 55 and is set into the image signal.

One period of the image clock $T_4$ is set to the same time as that of the components of the red signal R, green signal G, blue signal B, and black signal X.

Further, the time when the image clocks 1T and 2T are at the H level corresponds to the red signal R. The time when the image clock 1T is at the H level and the image clock 2T is at the L level corresponds to the green signal G. The time when the image clock 1T is at the L level corresponds to the blue signal B. The time when the image clocks 1T and 2T are at the L level corresponds to the black signal X.

Figure 10:
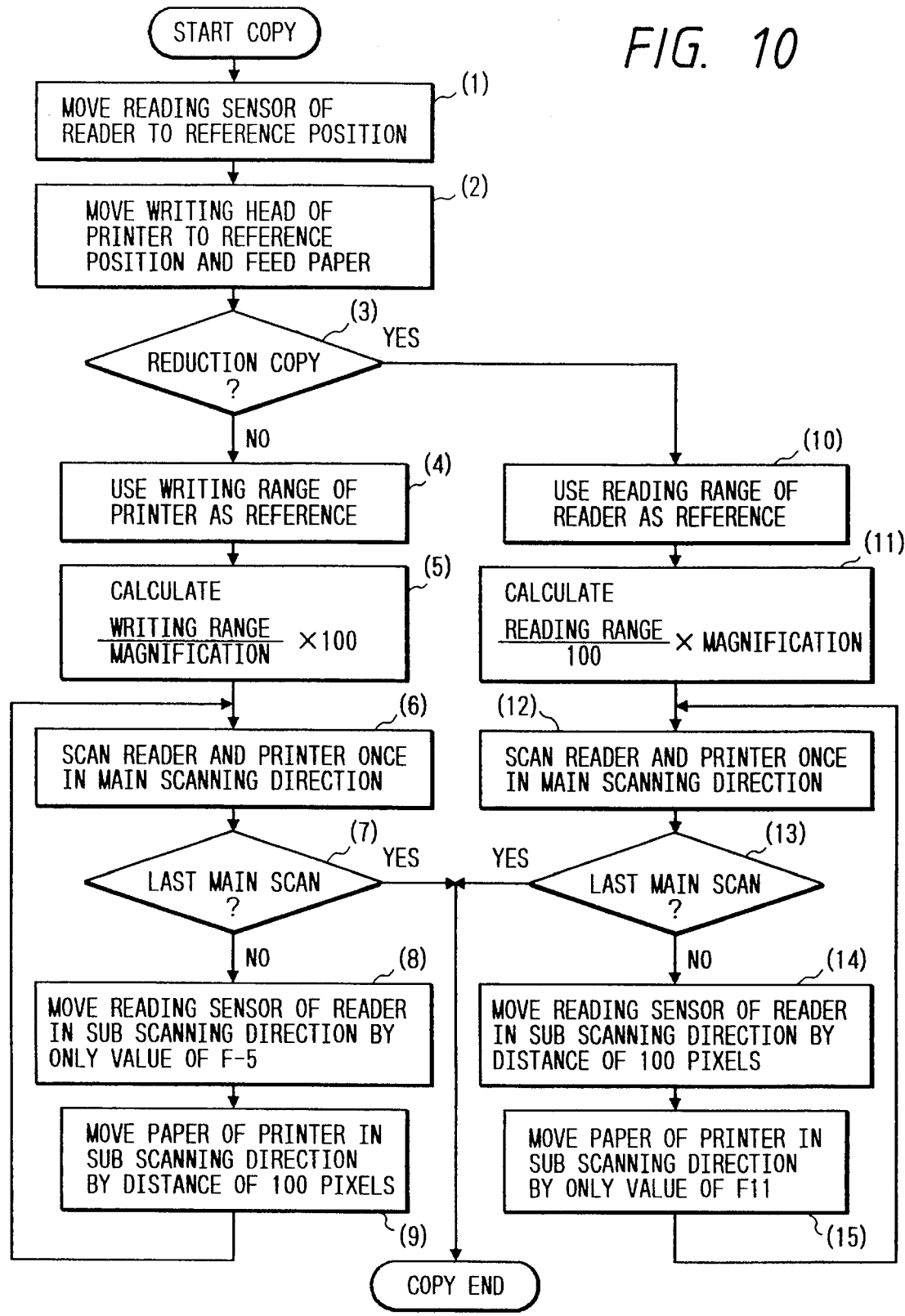
FIG. 10 is a flowchart for explaining an example of a copying sequence of the copying apparatus shown in FIG. 1.

FIG. 10 is a flow chart for explaining an example of a copying sequence of the copying apparatus 21 shown in FIG. 1. Reference numerals (1) to (15) indicate steps.

When the copy key 70 is depressed, first, in order to move the reading sensor of the reader to the reference positions of the main scan and the sub scan (the photo interrupter 2 which functions as a main scanning position sensor and the photo interrupter 3 which functions as a sub scanning position sensor), a signal is supplied from the CPU 24 to the motor driver 27 so as to rotate the stepping motor 9 which functions as a main scan motor of the reader, thereby moving the reading sensor to the reference position (step 1). Signals are supplied from the CPU 24 to the motor drivers 25 and 26 so as to move the print head 12 to the sub scanning reference position of the printer (point at which the printer head 12 transverses the photo interrupter 10 which functions as a sub scanning position sensor), thereby moving the print head to the reference position (step 2).

Subsequently, a copy paper 23 is fed and the roller 17 is rotated until the paper transverses the paper detecting sensor (photo interrupter) 11. After the paper was detected by the paper detecting sensor 11, the copy paper 23 is further fed by a predetermined amount.

Subsequently, before the copying operation is started, a check is made to see if a preset copy magnification is a reduced magnification or not (step 3). If NO (enlargement), the maximum range (every 100 pixels of cyan, magenta, yellow, and black) for writing in the sub scanning direction of the printer is stored into the CPU 24 so as to operate by using such a maximum range as a reference (step 4). The number of maximum writing range pixels of the printer is divided by the magnification and the resultant value is increased by 100 times, thereby obtaining the number of pixels in the reading range of the reader (step 5).

Each of the reader and printer is scanned by one step in the main scanning direction (step 6). The information of the original 22 is read by the reader and the read information is written onto the paper 23. A check is now made to see if the scan in the main scanning direction is the final main scan of the copy or not (step 7). If YES, the processing routine is finished. If NO, the position of the reading sensor of the reader is moved in the sub scanning direction by a distance of only the number of pixels calculated in step (5) (step 8). A signal is supplied from the CPU 24 to the motor driver 26 in order to move the reading sensor to the position to read the image in the next main scan of the reader. The stepping motor 9 as a motor to drive the reader in the sub scanning direction is rotated by only the necessary number of steps.

Subsequently, the position of the paper of the printer is moved in the sub scanning direction by the distance of 100 pixels. In order to move the print head to the position to write the image in the next main scan of the printer, a signal is supplied from the CPU 24 to the motor driver 28, and the stepping motor 20 of the printer is rotated (step 9). The processing routine is returned to step (6).

On the other hand, if YES in the judgment of step (3), the reading maximum range (100 pixels in red, green, and blue) in the sub scanning direction of the reader is stored into the CPU 24 so as to operate by using such a maximum range as a reference (step 10). The magnification is multiplied to the number of maximum reading range pixels of the reader and the resultant value is divided by 100 (step 11), so that the number of pixels in the writing range of the printer is obtained.

Each of the reader and printer is scanned by one step in the main scanning direction (step 12). The information of the original 22 is read by the reader and the read information is printed onto the paper 23. A check is now made to see if the scan in the main scanning direction is the final main scan of the coy or not (step 13). If YES, the 1 processing routine is finished. If NO, the position of the reading sensor of the reader is moved in the sub scanning direction by the distance of 100 pixels. In order to move the reading sensor to the position to read the image in the next main scan of the reader, a signal is supplied from the CPU 24 to the motor driver 26 and the motor 9 to drive the reader in the sub scanning direction is rotated by the necessary number of rotations (step 14). The position of the paper of the printer is moved in the sub scanning direction by the distance of only the number of pixels obtained by the calculation in step (11) (step 15). In order to move the print head to the position to write the image in the next main scan of the printer, a signal is supplied from the CPU 24 to the motor driver 28. The stepping motor 20 which functions as a motor to drive the printer in the sub scanning direction is rotated by the necessary number of rotations. The processing routine is returned to step (12).

The image editing processes by the editing apparatus 107 shown in FIG. 1 will now be described with reference to FIGS. 11 and 12.

Figure 11:
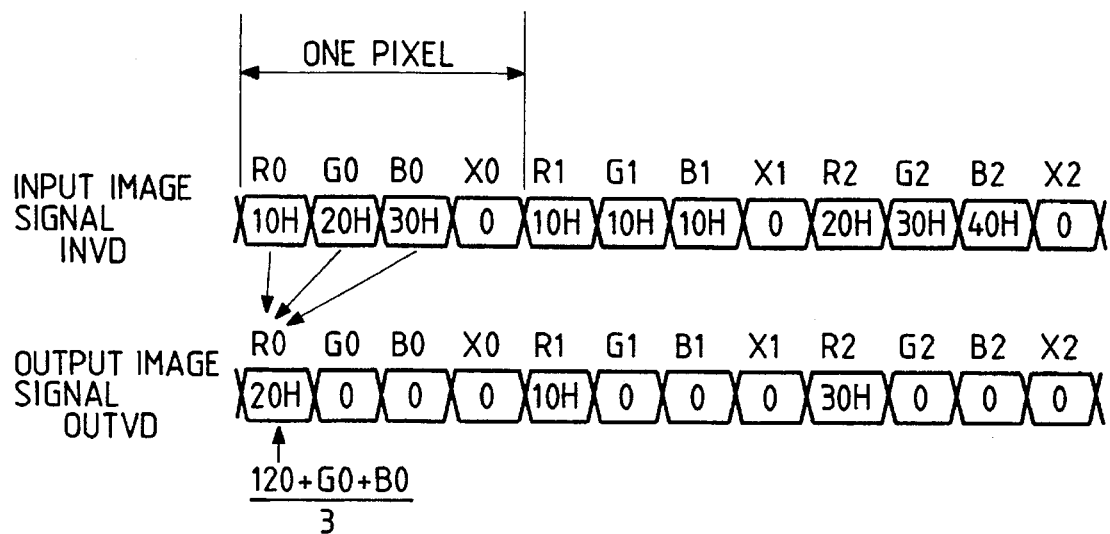
FIG. 11 is a diagram showing input and output image signals in an R monochromatic mode according to an editing apparatus shown in FIG. 1.

FIG. 11 is a diagram showing input and output image signals in the R monochromatic mode by the editing apparatus 107 shown in FIG. 1.

Figure 12:
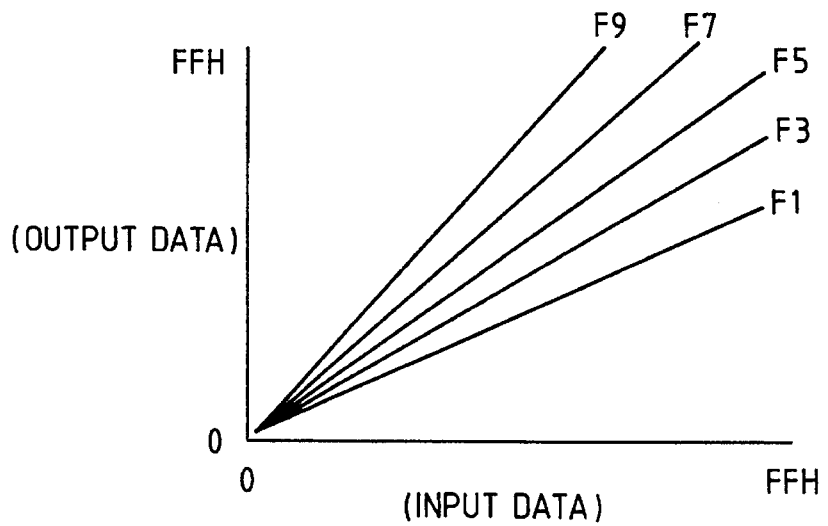
FIG. 12 is a characteristic diagram for explaining a density converting process according to the editing apparatus shown in FIG. 1.

FIG. 12 is a characteristic diagram for explaining the density converting process by the editing apparatus 107 shown in FIG. 1. An axis of abscissa denotes input data and an axis of ordinate indicates output data.

In the diagram, $F_1$, $F_3$, $F_5$, $F_7$, and $F_9$ indicate conversion table characteristics.

For instance, the image signal which has been subjected to the image process such as variable magnification or the like passes through the shading correcting circuit 52, logarithm converting circuit 54, color correcting circuit 55, two-valuing circuit 56, print head driver 57, and print head 12 shown in FIG. 2 and is printed onto the print paper 23.

In this instance, the image signal which has been subjected to the process of, for instance, the shading correcting circuit 52 passes through the connector 60 shown in FIG. 2 and is sent to the image memory 101 of the editing apparatus 107 and can be subjected to a process such as an edition or the like. There is also a case where after completion of the process, the image signal is transmitted through the connector 60 and is processed by the logarithm converting circuit 54.

In such a case, on the copying apparatus side, either a mode to use the image signal from the image memory 101 and the image clocks or a mode to use the image clocks from the signal generating circuit 58 or the image signal which is generated from the shading correcting circuit 52 is selected by the selectors 53 and 59.

For instance, in the case where the editing apparatus 107 is connected to the copying apparatus 21 and the R monochromatic color is selected as an editing mode by the operating section shown in FIG. 5, an input image signal INVD which has been shading corrected by the shading correcting circuit 52 is once stored into the image memory 101. For example, $(R_0+G_0+B_0)$ of the 0th pixel is added every pixel, the arithmetic mean value is converted as an $R_0$ signal every pixel, and a final output image signal OUTVD is produced. The output image signal OUTVD is supplied to the logarithm converting circuit 54 through the connector 60 and selector 53 and printed. At this time, since the image clocks themselves supplied to the image memory 101 are supplied to the logarithm converting circuit 54 through the selector 59, a clock synchronization-adjusting process becomes unnecessary.

Further, in the case where the density conversion of the editing apparatus is set, as shown in FIG. 12, the input data to the image memory 101 is density converted with reference to the conversion tables corresponding to the density converting characteristics $F_1$, $F_3$, $F_5$, $F_7$, and $F_9$ which have been preset. The density converted data is supplied to the logarithm converting circuit 54 via the connector 60 and selector 53 and printed. In this instance, since the image clocks themselves supplied to the image memory 101 are supplied to the logarithm converting circuit 54 through the selector 59, the clock synchronization adjusting process becomes unnecessary.

The data communication processing operation between the copying apparatus 21 and the editing apparatus 107 will now be described with reference to FIG. 13.

Figure 13:
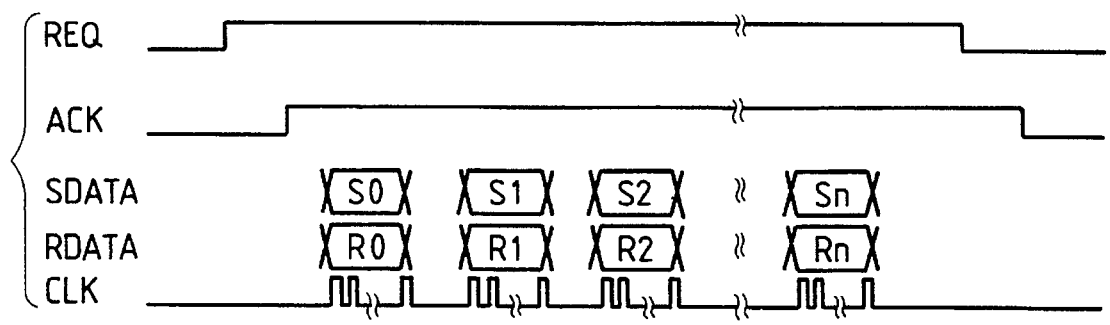
FIG. 13 is a timing chart for explaining a data communicating process between the copying apparatus and the editing apparatus shown in FIG. 1.

FIG. 13 is a timing chart for explaining the data communicating process between the copying apparatus 21 and the editing apparatus 107 shown in FIG. 1.

When the power source (5 V) of the copying apparatus is ON, the copying apparatus connection signal FCNT shown in FIG. 3 is set to the H level (5 V). When the power source (5 V) of the editing apparatus 107 is ON, the editing apparatus connection signal HCNT is set to the H level(5 V). A fact that the power sources are applied to the CPUs 24 and 100 can be detected by the editing apparatus connection signal HCNT and the copying apparatus connection signal FCNT. The communication is started after the power sources were applied to both of the CPUs 24 and 100. The communication is waited until the CPU 24 sets a request signal REQ to the H level and an acknowledge signal ACK is set to the H level. When the request signal REQ is set to the H level, the CPU 100 sets data RDATA which is necessary for communication into the register 100a and sets the acknowledge signal ACK to the H level, thereby informing the copying CPU 24 of the fact that the preparation of the communication is ready. When the acknowledge signal ACK is set to the H level, the CPU 24 generates a clock CLK for communication and exchanges the data between the CPU 24 and the CPU 100 synchronously with the clock. After the necessary data was exchanged, the CPU 24 sets the request signal REQ to the L level and waits until the acknowledge signal ACK is set to the L level. When the request signal REQ is set to the L level, the CPU 100 judges that the communication data has been exchanged. The CPU 100 subsequently loads the data from the register in which the communication data is stored and sets the data into a necessary area and sets the acknowledge signal ACK to the L level, thereby informing the CPU 24 of the fact that the communication data has been received. The CPU 24 detects that the acknowledge signal ACK has been set to the L level, thereby finishing the communication of one time. Further, when it is necessary to exchange the data between the CPUs 24 and 100, the above processes are repeated.

Figure 14:
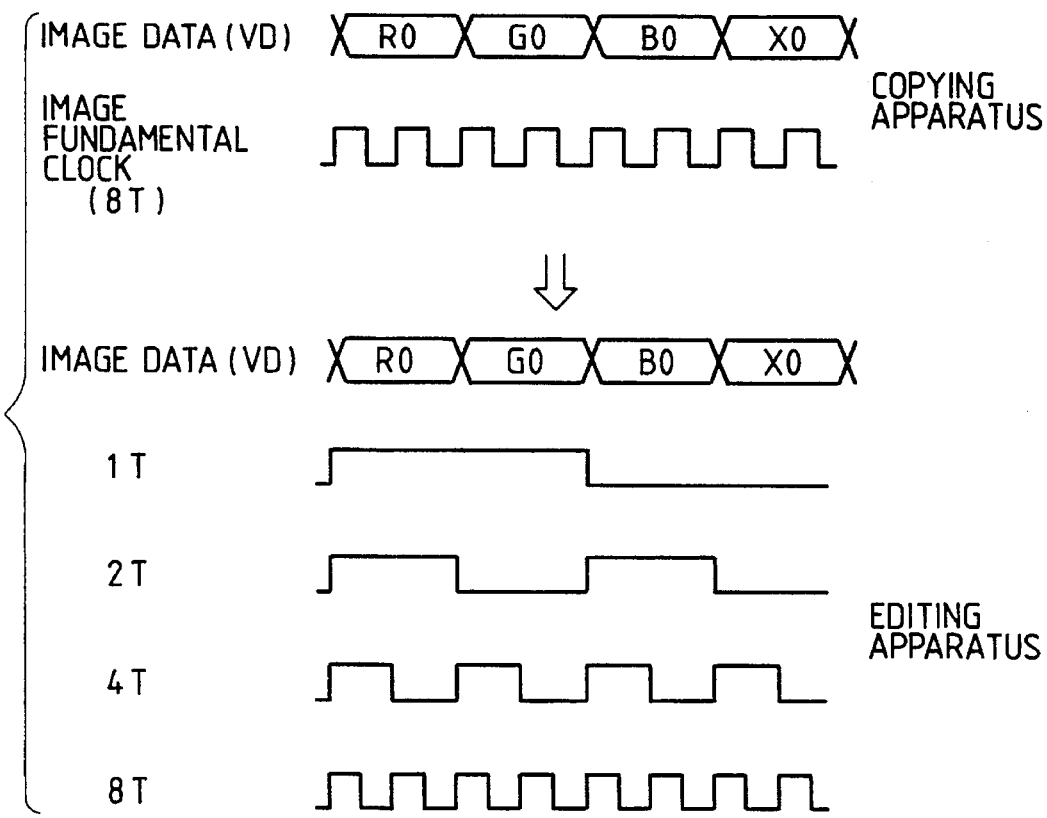
FIG. 14 is another timing chart for explaining the image processing operation of the copying apparatus shown in FIG. 1.
Figure 15:
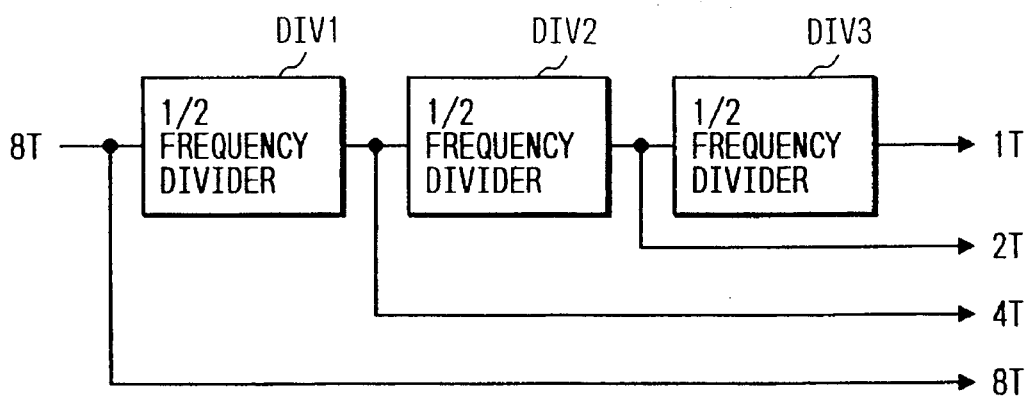
FIG. 15 is a block diagram for explaining a construction of another main section in the editing apparatus shown in FIG. 1.

Although the above embodiment has been described with respect to the case where the image data VD and the image clocks 1T, 2T, 4T, and 8T are transmitted and received through the connector 60, as shown in FIG. 14, it is also possible to construct in a manner such that only the image data VD and the image fundamental clock (image clock 8T) (image clock of the highest frequency among the image clocks) are sent to the editing apparatus from the copying apparatus side. As shown in FIG. 15, accordingly, by constructing such that frequency dividers $DIV_1$ to $DIV_3$ are provided on the editing apparatus side and the image clocks 1T, 2T, and 4T are formed from the image fundamental clock (image clock 8T), the image data VD can be transferred at a high speed.

A method of discriminating the editing apparatus 107 which is connected to the connector 60 shown in FIG. 2 will now be described hereinbelow with reference to FIGS. 16 and 17.

Figure 16:
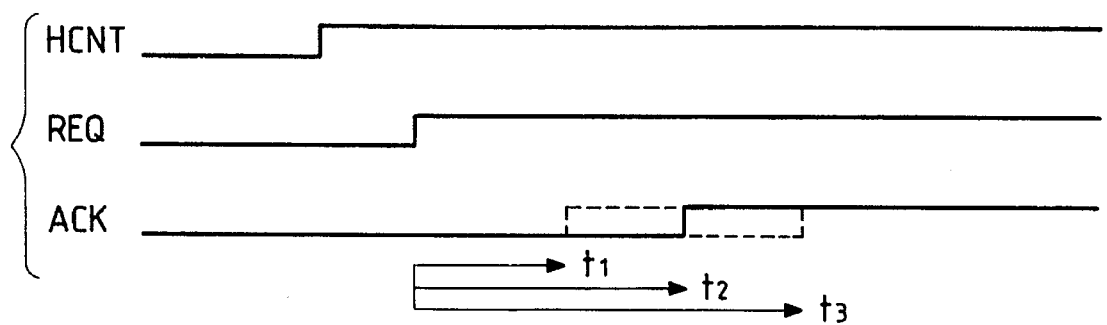
FIG. 16 is a timing chart for explaining a first discriminating process of an external apparatus which is connected to a connector shown in FIG. 2.

FIG. 16 is a timing chart for explaining the first discriminating process of an external apparatus which is connected to the connector 60 shown in FIG. 2.

Figure 17:
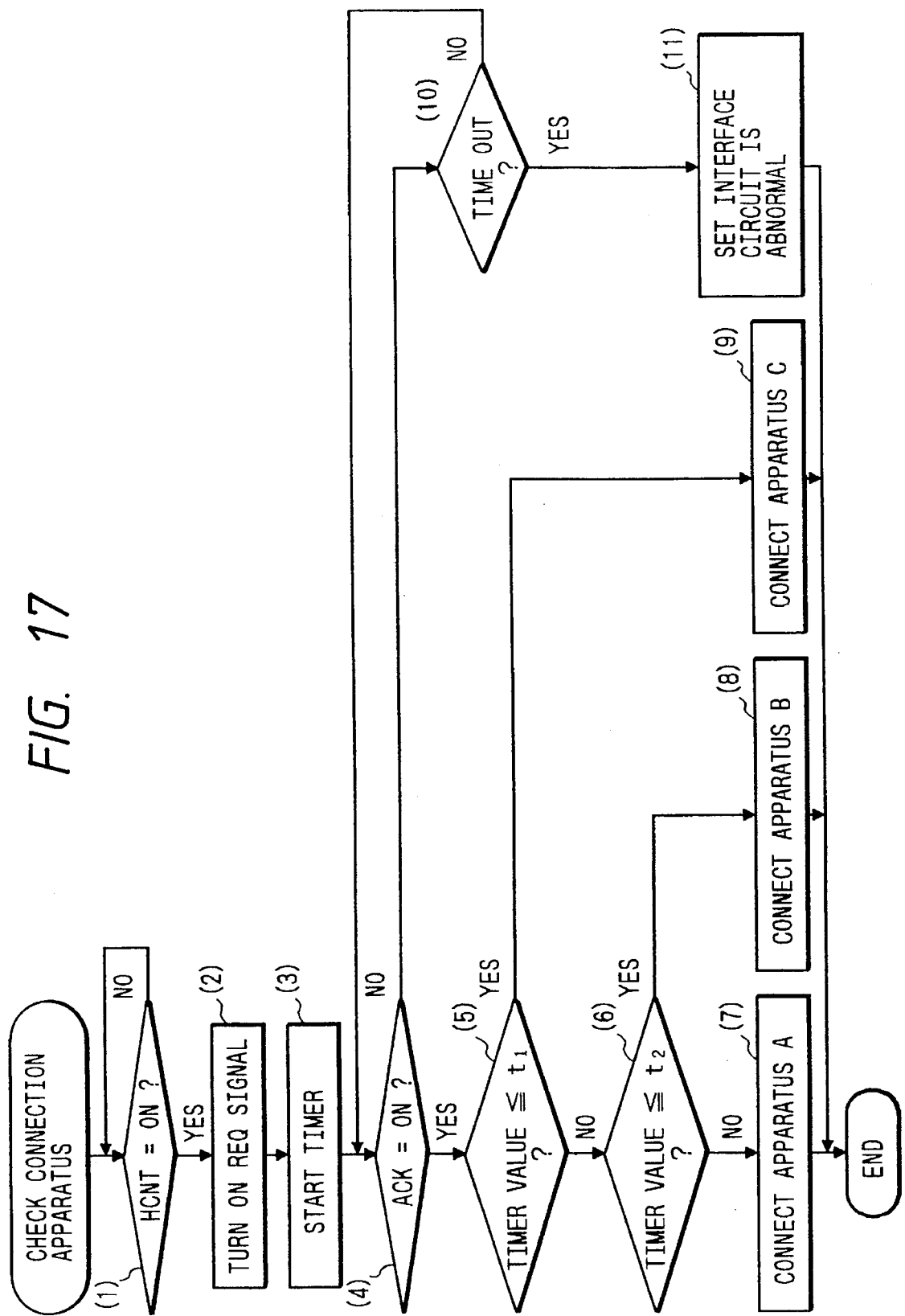
FIG. 17 is a flowchart for explaining an example of a first discrimination process procedure of an external apparatus which is connected to the connector shown in FIG. 2.

FIG. 17 is a flowchart for explaining an example of the first discrimination processing procedure of the external apparatus which is connected to the connector 60 shown in FIG. 2. Reference numerals (1) to (11) indicate steps.

Whether the editing apparatus 107 is connected or not is judged by checking to see if the editing apparatus connection signal HCNT is set to ON or not (step 1). If it is ON, the request signal REQ of the CPU 24 is turned ON (step 2) and a communication start signal is sent to the editing CPU 100.

An internal timer of the CPU 24 is subsequently started (step 3). Whether the CPU 100 has completed the communication preparation or not is judged by checking to see if the acknowledge signal ACK is set to ON or not (step 4). If YES, the CPU 24 discriminates whether the acknowledge signal ACK has been turned ON within a preset timer value $t_1$ or not (step 5). If YES, step (9) follows and it is recognized that an apparatus C has been connected as a connection apparatus. A message indicative of such a recognition is registered into an internal memory area. After that, a communicating mode C is set and the processing routine is finished.

On the other hand, when NO in the judgment of step (5), the CPU 24 checks to see if the acknowledge signal ACK has been turned ON within a preset timer value $t_2$ or not (step 6). If YES, step (8) follows and it is recognized that an apparatus B has been connected as a connection apparatus. A message indicative of such a recognition is registered into an internal memory area. After that, a communicating mode B is set and the processing routine is finished.

On the other hand, if NO in the judgment of step (6), the CPU 24 recognizes that the apparatus B has been connected as a connection apparatus. A message indicative of such a recognition is registered into an internal memory area. After that, the communicating mode B is set (step 7). The processing routine is finished.

On the other hand, if NO in the judgment of step (4), a check is made to see if the timer which had started in step (3) has been finished or not (step 10). If NO, the processing routine is returned to step (4). If YES, a flag indicative of an abnormality of the interface circuit is set (step 11). The processing routine is finished.

Figure 18:
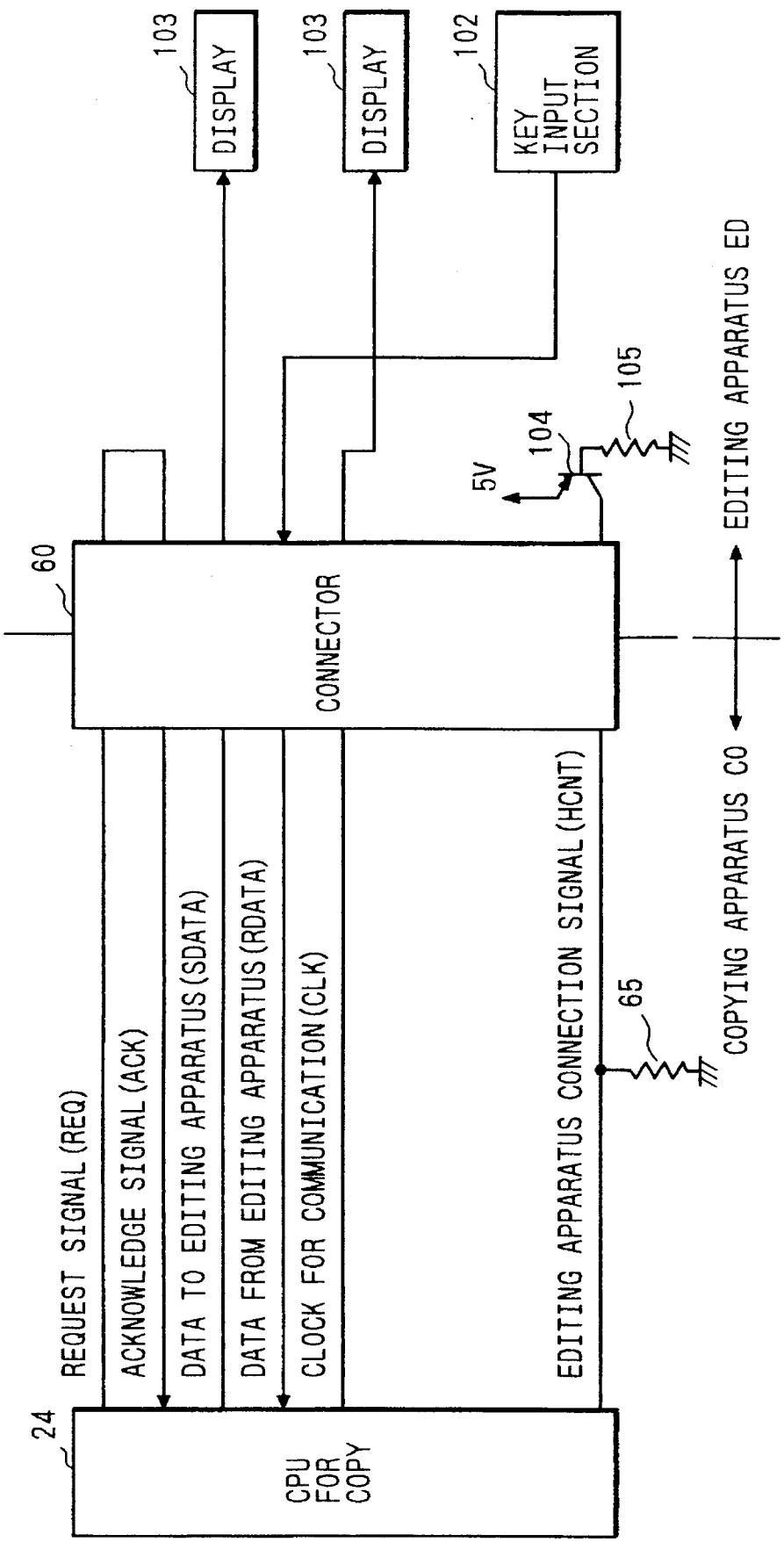
FIG. 18 is another circuit block diagram for explaining an interface between the copying CPU and the editing CPU shown in FIG. 2.

Although the case where the connecting states of the editing apparatus 107 and the copying apparatus 21 are discriminated from the set state of the copying apparatus connection signal FCNT has been described, as shown in FIG. 18, the kind of connection apparatus can be also recognized from the set state of the acknowledge signal ACK for the state of the request signal REQ.

FIG. 18 is another circuit block diagram for explaining the interface between the copying CPU 24 and the editing CPU 100 shown in FIG. 2. The same component elements as those shown in FIG. 3 are designated by the same reference numerals.

Figure 19:
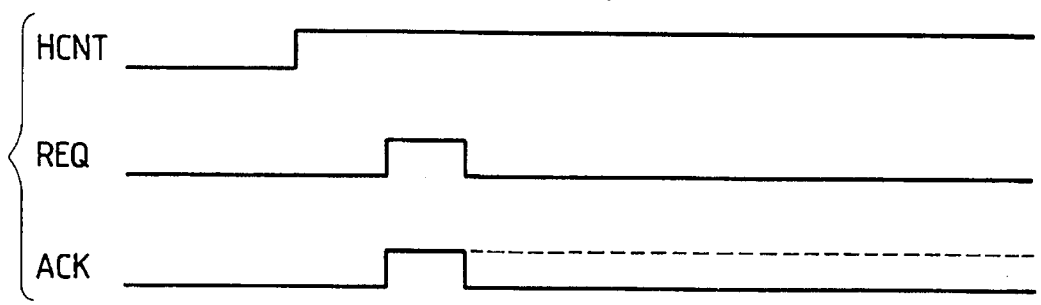
FIG. 19 is a timing chart for explaining a second discriminating process of an external apparatus which is connected to the connector shown in FIG. 2.

FIG. 19 is a timing chart for explaining the second discriminating process of the external apparatus which is connected to the connector 60 shown in FIG. 2.

Figure 20:
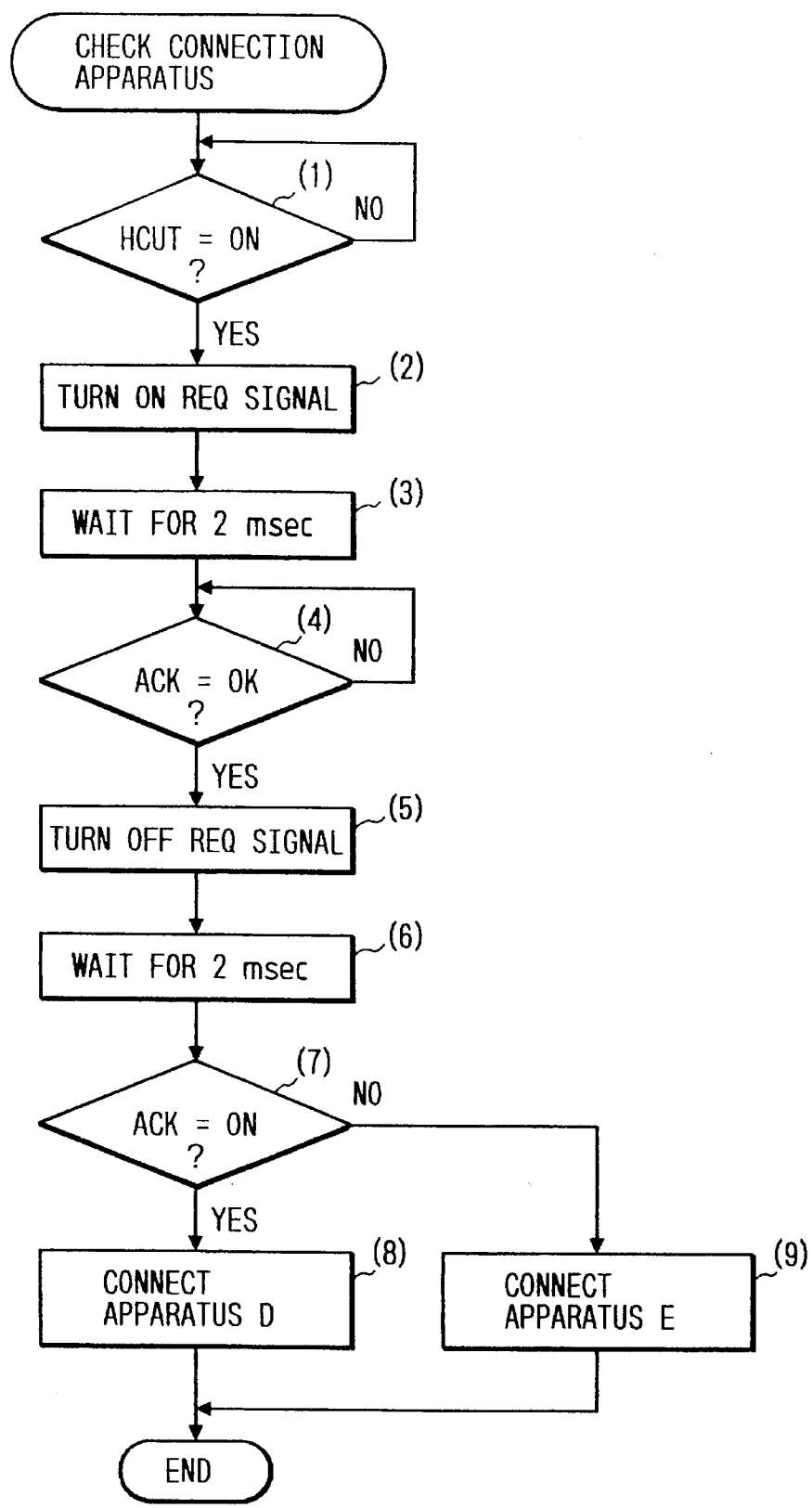
FIG. 20 is a flowchart for explaining an example of a second discrimination processing procedure of an external apparatus which is connected to the connector shown in FIG. 2.

FIG. 20 is a flowchart for explaining an example of the second discrimination processing procedure of the external apparatus which is connected to the connector 60 shown in FIG. 2. Reference numerals (1) to (9) denote steps.

Whether the editing apparatus 107 has been connected or not is judged by checking to see if the editing apparatus connection signal HCNT has been set to ON or not (step 10). If NO, the request signal REQ of the CPU 24 is turned ON (step 2) and the communication start signal is sent to the editing CPU 100.

The CPU 24 subsequently executes a waiting cycle of 2 msec (step 3). When the acknowledge signal ACK is set to ON (step 4), the request signal REQ of the CPU 24 is turned OFF (step 5). Further, the CPU 24 executes the waiting cycle of 2 msec (step 6). A check is now made to see if the set state of the acknowledge signal ACK is ON or not (step 7). If YES, it is recognized that an apparatus D has been connected as a connection apparatus (step 8). A message indicative of such a recognition is registered into an internal memory area. After that, a communication mode D is set and the processing routine is finished.

On the other hand, if NO in the judgment of step (7), it is recognized that an apparatus E has been connected as a connection apparatus (step 9). A message indicative of such a recognition is registered into an internal memory area.

After that, a communicating mode E is set and the processing routine is finished.

Figure 21:
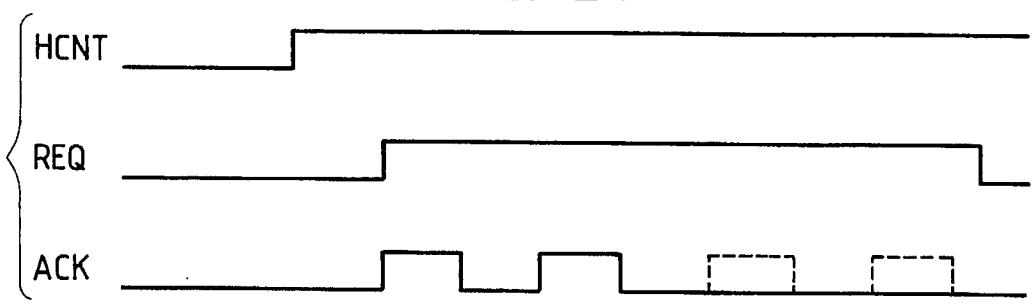
FIG. 21 is a timing chart for explaining a third discriminating process of an external apparatus which is connected to the connector shown in FIG. 2.

Although the above embodiment has been described with respect to the case where the kind of connection apparatus is discriminated from the set state of the acknowledge signal ACK after the request signal REQ was turned OFF, as shown in FIG. 21, the kind of connection apparatus can be also judged by counting the number of times of the acknowledge signal ACK which is supplied after the request signal REQ was turned ON.

FIG. 21 is a timing chart for explaining the third discriminating process of the external apparatus which is connected to the connector 60 shown in FIG. 2.

Practically speaking, the CPU 24 checks the level of the editing connection signal HCNT. When the editing connection signal HCNT changes from the L level to the H level, it is determined that the apparatus has been connected to the connector 60 or the power source of the apparatus connected is ON, so that the judgment of the connection apparatus is started.

First, the CPU 24 sets the request signal REQ to the H level. Subsequently, after the request signal REQ was set to the H level, the level of the acknowledge signal ACK of the CPU 24 is checked.

Subsequently, the number of L/H setting times of the acknowledge signal ACK which have been executed for a period of time when the request signal REQ is at the H level (the time of the H level has been preset) is counted. The kind of apparatus connected to the connector 60 is judged from the count value.

The above embodiment has been described above with respect to the case where the number of L/H setting times of the acknowledge signal ACK which have been executed for a period of time when the request signal REQ is at the H level (the time of the H level has been preset) is counted and the kind of apparatus connected to the connector 60 is discriminated from the count value. However, as shown in FIG. 22, in the above embodiment, it is also possible to construct so as to judge from the signal level of the acknowledge signal ACK which is returned from the connection apparatus for a period of time when the request signal REQ is set at the H level (the time of the H level has been preset).

Figure 22:
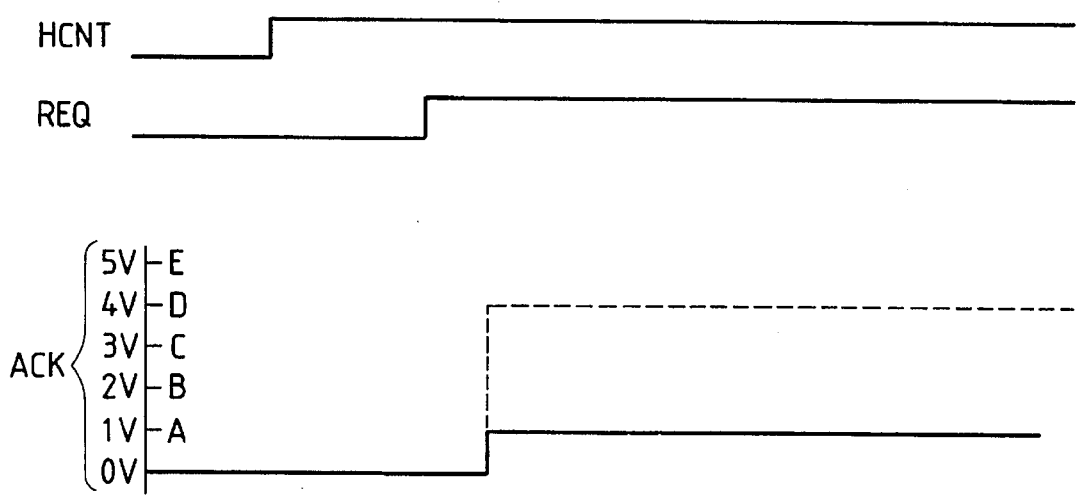
FIG. 22 is a timing chart for explaining a fourth discriminating process of an external apparatus which is connected to the connector shown in FIG. 2.

FIG. 22 is a timing chart for explaining the fourth discriminating process of the external apparatus which is connected to the connector 60 shown in FIG. 2.

Practically speaking, the CPU 24 checkes the level of the editing connection signal HCNT. When the editing connection signal HCNT changes from the L level to the H level, it is determined that the apparatus has been connected to the connector 60 or the power source of the apparatus connected is ON, so that the discrimination of the connection apparatus is started.

First, the CPU 24 sets the request signal REQ to the H level. Subsequently, the request signal REQ is set to the H level and, after that, a level change of the acknowledge signal ACK of the CPU 24 is checked.

In this instance, as shown in FIG. 22, when the signal level of the acknowledge signal ACK changes from 0 V to another voltage level, it is determined that the information from the connection apparatus has been returned. The kinds of apparatuses A to E as connection apparatuses can be decided by the signal voltages 1 to 5 V of the acknowledge signal ACK at that time (although not shown in the embodiment, through an A/D conversion port provided in the CPU 24 or the A/D converter 50).

It is also possible to integratedly judge by combining the discriminating processes shown in the embodiments mentioned above.

Although the above discriminating process has been described with respect to the case of performing the discrimination judging process to the interface signal, the invention can be also easily applied to judge the kinds of signals in the connector 60, for instance, the image data and the image clock.

Effects of the Invention

As described above, according to the invention, the signal generating means for generating predetermined image clocks to transfer the image information and the selecting means for selecting either the predetermined image clocks generated from the signal generating means or the image clocks which are generated from the signal generating means and are returned via the editing apparatus are provided on the copying apparatus side. Therefore, the editing apparatus and the copying apparatus can mutually transfer the image information on the basis of the single image clock. Accordingly, there is no need to additionally provide the sync signal generating means and sync timing adjusting means and the like which are necessary for a data communication to the host side for the external apparatus side which is externally connected. A construction of the external apparatus can be fairly simplified. There are excellent effects such that an occurrence ratio of the adjustment deviation of the sync timing in the data communication as in the conventional apparatus extremely decreases and the data communicating processes can be performed at a high reliability, and the like.

I claim:

1. An image processing apparatus for controlling information transmission between a copying apparatus including image reading means and image forming means, and an editing apparatus which is externally connected through a predetermined interface, said image control apparatus comprising:

signal generating means for generating predetermined image clock signals to process the image information generated by said image reading means;

first selecting means for selecting either the predetermined image clock signals generated from said signal generating means or image clock signals which are generated from said signal generating means and transmitted through the editing apparatus back to said copy apparatus;

second selecting means for selecting either the image information generated by said image reading means or the image information transmitted from said editing apparatus to said copy apparatus;

processing means for processing the image information outputted from said second selecting means; and control means for controlling said first selecting means and said second selecting means so that the image information generated by said image reading means is processed by the image clock signals generated by said signal generating means and the image information transmitted from said editing apparatus to said copy apparatus is processed by the image clock signals transmitted from said editing means back to said copy apparatus.

2. An image processing apparatus according to claim 1, wherein said signal generating means generates a plurality of image clock signals whose frequencies are different from each other.

3. An image processing apparatus according to claim 1, further comprising:

a first signal line for transmitting said predetermined image signals generated by said signal generating means to said editing apparatus;

a second signal line for receiving the image clock signals transmitted from said signal generating means to said editing apparatus through said first signal line and then transmitted from said editing apparatus back to said copy apparatus; and a third signal line for receiving the image information transmitted from said editing apparatus to said copy apparatus.

4. An image processing apparatus comprising:

a copy unit including, within the same housing, reading means for reading an image of an original, recording means for recording the image read by said reading means on a recording sheet, clock generation means for generating a clock signal, and a connector for outputting the image read by said reading means and the clock signal generated by said clock generation means to an external device; and an editing unit including, connected with said copy unit through a cable, receiving means for receiving the image and the clock signal output from said copy unit, processing means for editing the received image, said processing means using the received clock signal as a synchronization signal for editing, and output means for outputting the image edited by said processing means and the clock signal used as the synchronization signal to said copy unit, said editing unit being included in a housing different from the housing which includes said copy unit, wherein said copy unit includes transfer means for transferring the image and the clock signal from said editing unit to said recording means, and wherein said recording means uses the transferred clock signal as a synchronization signal for recording and records the transferred image on the recording sheet.

5. An apparatus according to claim 4, wherein said transfer means includes a first selector for switching between outputting the image read by said reading means to said recording means and outputting the image output from said editing unit to said recording means and a second selector for switching between outputting the clock signal generated by said clock signal generation means to said recording means and outputting the clock signal output from said editing unit to said recording means.

6. An apparatus according to claim 4, wherein said reading means reads a color image and wherein said recording means records the color image.

7. An apparatus according to claim 4, wherein said recording means is an ink jet printer.

8. An image processing apparatus comprising:

a copy unit including, within the same housing, reading means for reading a color image of an original, first setting means for setting a copy mode, recording means for recording the color image read by said reading means on a recording sheet according to the copy mode set by said setting means, clock generation means for generating a clock signal, and a connector for outputting the color image read by said reading means and the clock signal generated by said clock generation means to an external device; and an editing unit, connected with said copy unit through said connector, including second setting means for setting a copy mode which includes a color conversion mode, receiving means for receiving the color image and the clock signal output from said copy unit, processing means for editing the received color image, said processing means using the received clock signal as a synchronization signal for editing, and output means for outputting the color image edited by said processing means and the clock signal used as the synchronization signal to said copy unit, said editing unit being included in a housing different from the housing of said copy unit, wherein said copy unit includes transfer means for transferring the color image and the clock signal output from said editing unit to said recording means, and wherein said recording means uses the transferred clock signal as a synchronization signal for recording and records the transferred color signal on the recording sheet.

9. An apparatus according to claim 8, wherein said copy unit includes a selector for switching between outputting the color image read by said reading means to said recording means and outputting the color image output from said editing unit, to said recording means and a second selector for switching between outputting the clock signal generated by said clock signal generation means to said recording means and outputting the clock signal output from said editing unit to said recording means.

10. An apparatus according to claim 7, wherein said recording means is an ink jet printer.

11. An image processing apparatus comprising:

generation means for generating a plurality of clock signals having different frequencies, for processing of a color image signal;

processing means for processing the color image signal synchronously with said plurality of clock signals generated by said generation means; and discrimination means for discriminating the level of each of said plurality of clock signals generated by said generation means and discriminating, according to the discriminated level, a color component of the color image signal to be processed by said processing means.

12. An apparatus according to claim 11, wherein said color image signal includes four color components and wherein said generation means generates four different clock signals.

13. An editing apparatus connected to a copying apparatus, comprising:

input means for inputting an image signal and a clock signal output from said copying apparatus;

setting means for setting an editing mode;

processing means for editing the image signal input by said input means according to the editing mode set by said setting means, said processing means using the clock signal input by said input means as a synchronization signal for editing; and output means for outputting the image signal edited by said processing means and the clock signal used as the synchronization signal to said copying apparatus.

14. An apparatus according to claim 13, wherein said input means inputs a color image signal and wherein said output means outputs the color image signal.

15. An apparatus according to claim 14, wherein said editing mode includes a color conversion mode.

16. A control method for an image processing apparatus which comprises a copy unit including, within the same housing, reading means for reading an image of an original, recording means for recording the image read by said reading means on a recording sheet, and clock generation means for generating a clock signal, and an editing unit including, connected with said copy unit through a connector, receiving means for receiving the image and the clock signal output form said copy unit and processing means for editing the received image, said editing unit being included in a housing different from the housing which includes said copy unit, comprising the steps of:

a) reading the image of the original by said reading means;

b) outputting the image read by said reading means and the clock signal generated by said generation means to said editing unit;

c) receiving the image and the clock signal by said receiving means;

d) editing the received image by said processing means using the received clock signal as a synchronization signal for editing;

e) outputting the edited image and the clock signal used as the synchronization signal to said copy unit;

f) transferring the image and the clock signal output from said editing unit, to said recording means; and g) recording the transferred image on the recording sheet by said recording means, using the transferred clock signal as a synchronization signal for recording.

17. A method according to claim 16, wherein a color image is read in step a) and the color image is recorded in step g).

18. A control method for an editing apparatus connected to a copy apparatus, comprising the steps of:

a) setting an editing mode of image information;

b) inputting image information and a clock signal from said copy apparatus;

c) editing the input image information according to the editing mode set in step a), using the input clock signal as a synchronization signal for editing; and d) outputting the edited image information and the clock signal used as the synchronization signal to said copy apparatus.

19. A method according to claim 18, wherein color image information is input in step a) and the color image information is output in step d).

20. A method according to claim 19, wherein said editing mode includes a color conversion mode.

* * * * *